MODULATOR UTILIZING AN INSULATED GATE FIELD EFFECT TRANSISTOR

Filed Dec. 17, 1964 4 Sheets-Sheet 1

INVENTOR.
Shinichi Ohashi
Minoru Nagata

BY

H. Edward Mestern

MODULATOR UTILIZING AN INSULATED GATE FIELD EFFECT TRANSISTOR

Filed Dec. 17, 1964 4 Sheets-Sheet 2

INVENTOR.
Shinichi Ohashi
Minoru Nagata

BY

H. Edward Masters

MODULATOR UTILIZING AN INSULATED GATE FIELD EFFECT TRANSISTOR

Filed Dec. 17, 1964 4 Sheets-Sheet 3

INVENTOR.
Shinichi Ohashi
Minoru Nagata

BY

H. Edward Mestern

INVENTORS
SHINICHI OHASHI
MINORU NAGATA 3,391,354

MODULATOR UTILIZING AN INSULATED GATE FIELD EFFECT TRANSISTOR

Shinichi Ohashi and Minoru Nagata, Tokyo-to, Japan, assignors to Kabushiki Kaisha Hitachi Seisakusho, Tokyo-to, Japan, a joint-stock company of Japan Filed Dec. 17, 1964, Ser. No. 419,154
Claims priority, application Japan, Dec. 19, 1963, 38/68,118; Apr. 15, 1964, 39/21,005; Apr. 30, 1964, 39/24,201
7 Claims. (Cl. 332—31)

ABSTRACT OF THE DISCLOSURE

A modulator wherein a signal to be modulated is chopped by an insulated gate field-effect transistor whose first insulated gate is impressed with a control signal of a rectangular wave to operate the field-effect transistor as a switching device, and whose second gate is impressed with a compensating signal of an opposite rectangular wave to the control signal to compensate an offset caused through a stray capacitance between the first insulated gate and the drain of the insulated gate field-effect transistor.

This invention relates to modulator amplifier circuits employing solid state or semiconductor devices and more particularly to modulator amplifier circuits ultizing insulated gate field effect transistors.

Modulators utilizing solid state devices, for example, transistors, have offset voltages which are unavoidable in view of the construction of the transistor elements and other factors such as potentials across P-N junctions, backward saturation currents, thermal electromotive forces generated at junctions between different metals, and Johnson noise. It is also known that the voltage of the source of excitation appears across the output terminals through the interelectrode capacitance of the transistor which also causes the offset voltage.

The general object of this invention is to provide an improved modulator amplifier circuit wherein the above mentioned offset voltage is very low.

Another object of this invention is to provide a novel semiconductor modulator amplifier utilizing an insulated gate field effect transistor in its modulator portion.

A further object of this invention is to provide a novel semiconductor modulator amplifier wherein insulated gate field effect transistors are utilized not only as the modulator but also as the amplifier in the succeeding stage, and said amplifier and modulator are directly coupled without the utilization of a coupling capacitor.

A still further object of this invention is to provide a novel semiconductor modulator amplifier circuit wherein an insulated gate field effect transistor having two input terminals is used as the modulator thereof, and the modulating signal or an excitation signal is impressed upon one of the input terminals, while a voltage effective to cancel the offset caused by interelectrode capacitive coupling is applied to the other input terminal.

Other objects of the invention as well as the nature, principle, and details of the invention will be apparent from the following description taken in conjunction with the accompanying drawings in which like parts are designated by like reference characters or numerals, in which.

Figure 4A:
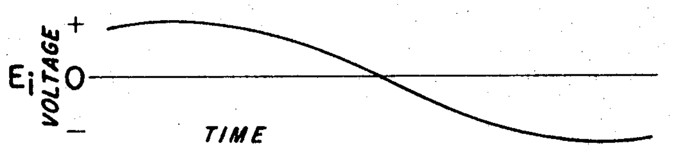
Figure 4B:
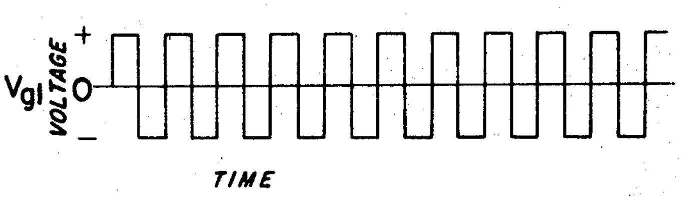
Figure 4C:
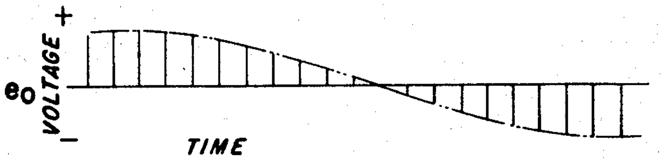
Figure 6:
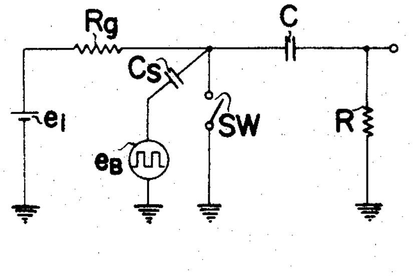
Figure 7A:
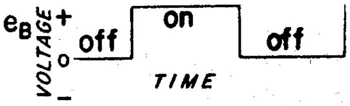
Figure 7B:
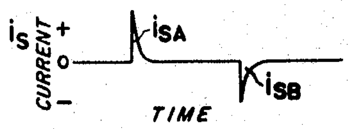
Figure 7C:
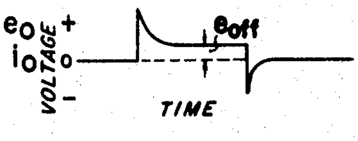
Figure 7D:
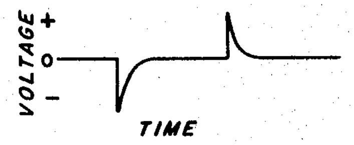
Figure 8B:
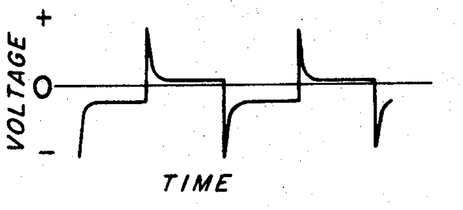
Figure 8A:
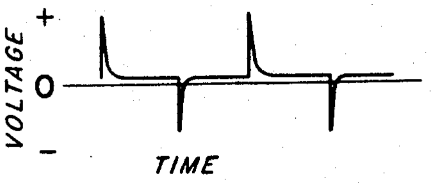
Figure 11A:
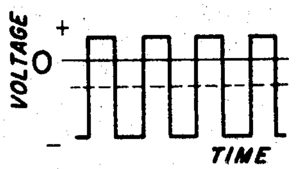
Figure 11B:
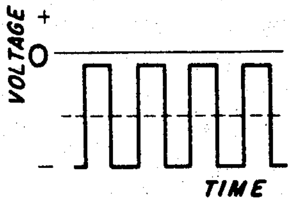

FIGS. 4(*a*), 4(*b*) and 4(*c*) show waveforms of input and output voltages and of the excitation voltage of a circuit embodying this invention;

FIG. 6 shows an equivalent circuit of the modulator section of this invention;

FIGS. 7(*a*), 7(*b*), 7(*c*) and 7(*d*) show waveforms at various parts of the circuit;

FIGS. 8(*a*) and 8(*b*) show a comparison between offset voltages of this circuit and those of a conventional circuit; and FIGS. 11(*a*) and 11(*b*) show waveforms of the excitation voltage.

Figure 1:
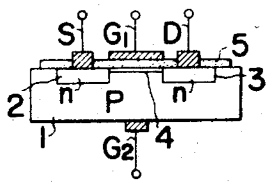
FIGS. 1 and 2 are schematic sectional views of insulated field effect transistors suitable for use according to this invention.

In order to indicate more fully the nature of this invention, one example of the construction of an insulated gate field effect transistor will first be considered. Referring to FIG. 1, there is shown a transistor of this type comprising a P type semiconductor substrate 1 and two N type semiconductor regions 2 and 3 formed thereon with a small spacing between them. Between these N type regions 2 and 3, there is formed a very thin channel 4 of the same conductivity type (N type) as these regions. An insulator film 5 consisting of silicon dioxide, for example, is formed to cover the channel 4, and a first gate electrode $G_1$ is attached to the upper surface of the film 5. A source electrode S and a drain electrode D are respectively connected to the regions 2 and 3, and a second gate electrode $G_2$ is attached to the substrate 1. If desired, the source electrode S and the drain electrode D may be interchanged.

Figure 2:
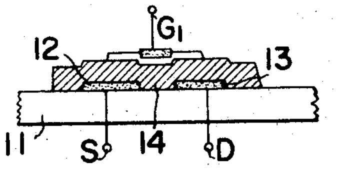

FIG. 2 illustrates an example of another construction of the insulated gate field effect transistor comprising a substrate 11, a source electrode 12 and a drain electrode 13 made of gold, for example, and formed on the substrate 11, and a channel layer 14 constituting a path for the electric current flowing between electrodes 12 and 13, and generally made of a very thin layer of CdSe, CdS, or the like having a thickness of from about 0.1 to 1 micron. On the upper surface of the channel layer 14, there is formed an insulator film made of $Al_2O_3$, for example, and a gate electrode $G_1$ is attached to this film.

It should be understood that it is preferable to utilize insulated gate field effect transistors of the constructions illustrated in FIGS. 1 and 2, but this invention is not limited to the use of these particular type transistors, and that any insulated gate field effect transistor may be utilized in this invention as long as it has a construction such that the current flowing between the source and drain electrodes can be controlled by an electric field created by a voltage impressed upon the channel layer through an insulator film.

In transistors having constructions described above, electric current flowing between the source electrode S and the drain electrode D can be controlled by a voltage impressed upon the first gate $G_1$ or the second gate $G_2$, so that they have an amplifying function similar to that of conventional junction type transistors. However, conventional junction type transistors generally have small input impedance, and, moreover, they include PN junctions, so that when they are used as modulators, they are disadvantageous in that offset voltages are created as described above. In contrast, the above described insulated gate field effect transistors are characterized by having extremely high input resistance (i.e., about $10^{15}$ ohms) and by having no P-N junctions between drains and source.

This invention is based on the utilization of these characteristics and contemplates the use of insulated gate field effect transistors as modulators, thereby to provide novel modulator amplifier circuits having very small offset.

Figure 3:
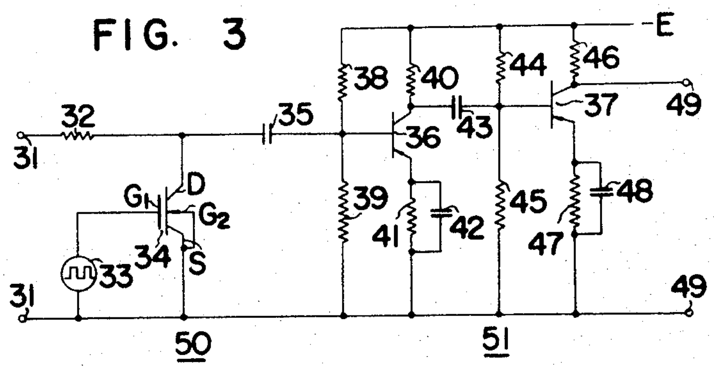
FIGS. 3, 5, 9, 10, 12 and 13 are circuit diagrams illustrating different embodiments of this invention.

Referring now to FIG. 3 which illustrates one embodiment of this invention which makes use of an insulated gate field effect transistor 34 of the type shown in FIG. 1. As schematically shown in the drawing, a source of excitation 33 of rectangular waveform is connected across the first gate electrode $G_1$ and the source electrode S, while the second gate electrode $G_2$ is connected directly to the source electrode S. Direct-current input signals to be amplified are impressed across the drain electrode D and the source electrode S of the insulated gate field effect transistor 34 through a pair of input terminal 31 and an input resistor 32. The drain electrode D is connected to the base electrode of a transistor 36 via a coupling capacitor 35. It is to be understood that this transistor 36 and a transistor 37 included in the succeeding stage may be of any conventional junction type and that, while they are shown herein as of PNP type, they may be of NPN type. Furthermore, any other suitable amplifying elements may be substituted for these transistors. Reference numerals 38, 39, and 41 designate biasing resistors for the transistor 36, and numerals 44, 45, and 47 represent biasing resistors for the transistor 37. An output is derived from a resistor 40 included in the collector circuit of the transistor 36 and is supplied to the base electrode of the transistor 37 via a coupling capacitor 43 to be amplified further thereby. The output which has been subjected to A-C amplification in response to the D-C inputs is derived from a resistor 46 associated with the transistor 37 and applied across the output terminals. Numerals 42 and 48 designate bypass capacitors inserted in the emitter circuits of the transistors 36 and 37 respectively.

In the above described circuit, components 31 through 34, inclusive, constitute a modulator unit 50 adapted to convert the input signal into an alternating-current voltage having the same frequency as that of the excitation source 33, and components 35 through 49, inclusive, constitute an alternating current amplifier unit 51 to amplify said alternating current.

The operation of the modulator amplifier circuit shown in FIG. 3 will now be described with reference to FIGS. 4(*a*)–4(*c*)

If it is assumed that a voltage $E_1$ having a waveform as shown in FIG. 4(*a*) is impressed across input terminals 31 and that a voltage $V_{g1}$ having a waveform as shown in FIG. 4(*b*) is impressed across the first gate electrode $G_1$ and the source electrode S of the field effect transistor 34, the current path between the drain and source electrodes of this transistor will be in the "cutoff" condition as long as the polarity of the voltage $V_{g1}$ is negative enough with respect to the source electrode S. The reason why the field effect transistor 34 is maintained in its "off" condition under the conditions just described is that, in response to the negative voltage impressed upon the first gate electrode $G_1$ (FIG. 1) a positive space charge is produced on the side facing the channel 4 to decrease the effective width of the channel 4, thereby decreasing the conductance thereof to an extremely small value.

Where an excitation voltage having a polarity opposite to that described above, or as long as the gate electrode $G_1$ is maintained positive or nearly zero with respect to the source electrode S, the field effect transistor 34 will be maintained in its "on" condition so that the input will be short circuited by the transistor 34.

The reason why the field effect transistor 34 is turned on by a positive voltage at its first gate electrode $G_1$ is that this creates a negative space charge layer in the channel 4 and increases the conductance in the channel. Thus, it will be clear that when negative and positive voltages are applied alternately to the first gate electrode $G_1$, the insulated gate field effect transistor 34 is turned "on" and "off" alternately so that the input is chopped, as shown by a waveform $e_0$ in FIG. 4(*c*), and thereafter transmitted to the amplifier unit 51. After being amplified by the amplifier unit 51, this signal is obtained from the output terminals 49.

The modulator amplifier circuit embodying this invention and constructed as above described has the following advantages because it utilizes an insulated gate field effect transistor. As has been the practice, if a junction type transistor for example, a PNP type transistor, were used in the modulator unit, owing to the presence of contact voltage of PN junction between the base and the emitter or collector electrodes, a small voltage would appear on the output side even when the transistor is maintained in its "on" state, thus causing offset, and since the value of this offset voltage is of the order of about 1 millivolt, it is usually necessary to connect two transistors having identical characteristics in a differential type circuit so as to cancel the offset voltage. In contrast, since the insulated gate field effect transistor utilized in this invention does not include any PN junction in the current path between the source and drain electrodes S and D, there is no offset voltage as described above, so that no differential configuration is necessary. Even with differential circuit arrangements, the junction type transistors produce offset voltages in a range of from 1 to 100 microvolts. In the circuits constructed according to this invention, the offset voltage can be decreased to less than a few microvolts by utilizing only one transistor. When a conventional junction type field effect transistor is utilized as a modulator wherein a voltage is impressed across its PN junction to control the width of the space charge layer at that junction, there is no offset caused by the contact potential, but a portion of the excitation current flows through the junction between the gate and drain electrodes to the input impedance 32 which causes the offset. Since the transistor utilized in this invention has an insulator layer covering the channel, and since the excitation voltage is impressed upon an electrode secured to this insulator layer there is no possiblity of the excitation current flowing into the external circuit. Furthermore, where a conventional field effect transistor is used wherein the width of the space charge region at the PN junction is controlled, it is necessary to assure that the excitation voltage is always impressed across the PN junction in the inverse direction, but in this invention such a consideration is not necessary because the excitation voltage is applied to an insulator film.

As has been described, by the novel circuit embodying this invention, offset voltages caused by PN contact potential and other causes can be effectively eliminated. In the following modifications, it is also possible to remove offset voltages which appear across the output terminals from the source of excitation through an interelectrode capacitance between the electrodes of a transistor utilized in the modulator.

Generally speaking, as the excitation frequency increases, an offset voltage is produced due to capacitances between the electrodes of the transistor. This offset has hitherto been neglected because it is smaller than offsets caused by PN contact potential and other causes but becomes a problem where the offset voltage caused by PN contact potential and other causes are eliminated through the use of the circuit shown in FIG. 3. However, it is not necessary to consider capacitances between all electrodes, but it is necessary to consider only the capacitance between the first gate electrode $G_1$ and the drain electrode D, which affects most seriously the offset voltage.

FIG. 6 of the accompanying drawings shows an equivalent circuit of a modulator unit of the embodiment shown in FIG. 3. In FIG. 6, $E_i$ represents the input voltage applied across the input terminals 31, $R_g$ the resistance of the input resistor 32, C the capacitance of the coupling capacitor 35, and R the input impedance of the amplifier unit 51. In FIG. 6 the insulated gate field effect transistor 34 is represented as a switch SW which is opened and closed in synchronism with the frequency of the excitation source EB, and $C_s$ represents the capacitance between the first gate electrode $G_1$ and the drain electrode D. With reference to FIGS. 7(*a*)–7(*d*) offset voltages which appear through the capacitance $C_s$ will now be considered. When an excitation voltage having a waveform as shown in FIG. 7(*a*) is applied with zero $e_i$ or with the input terminals short circuited, a current flows into the capacitor C through the stray capacitance $C_s$ as the switch SW is opened and closed. If the current which flows when the switch SW is operated from "on" to "off" state is denoted by $i_{SA}$, and the current which flows when the switch is operated from "off" to "on" state is denoted by $i_{SB}$, the charge ΔQ stored in the capacitor C by these currents $i_{SA}$ and $i_{SB}$ during one cycle of operation of the switch is given by the following equation.

$$\Delta Q=\int_0^T(i_{SA}+i_{SB})dt \quad (1)$$

On one hand, the voltage $V_c$ across the capacitor C will be substantially constant because it is usual to design the time constant i.e. CR to have a value sufficiently larger than the period of one cycle T. Accordingly, the electric charge ΔQ′ which is discharged from the capacitor C through $R_g$ and R during one cycle is given by the following equation.

$$\Delta Q'=\frac{V_c}{R}\frac{T}{2}+\frac{V_c}{R+Rg}\frac{T}{2} \quad (2)$$

wherein T is one cycle period of exciting voltage and $V_c$ is a voltage appearing across the capacitor.

When the operation of the circuit is in equilibrium, the relation between ΔQ and ΔQ′ should be $$\Delta Q=\Delta Q' \quad (3)$$

so that from Equations 1 and 2, $$V_c\frac{2}{T}\frac{R(Rg+R)}{2R+R_g}\int_0^T(i_{SA}+i_{SB})dt \quad (4)$$

Thus, the output offset voltage $\theta_{off}$ appearing across the resistance R is given by $$\theta_{off}=V_c\left(1-\frac{R}{R+R_g}\right)=\frac{2}{T}\frac{RR_g}{2R+R_g}\int_0^T(i_{SA}+i_{SB})dt \quad (5)$$

The waveform of this voltage is shown in FIG. 7(*c*). Thus, offset voltage is unavoidably produced unless the areas of the currents $i_{SA}$ and $i_{SB}$ are identical and cancel each other. When the modulator and the amplifier are coupled directly without the use of a capacitor or a transformer, current flows into the modulator from the amplifier side, which current is modulated and amplified to produce an offset voltage. Thus, it will be clear that offset voltage due to the capacitance C is unavoidably produced.

Figure 5:
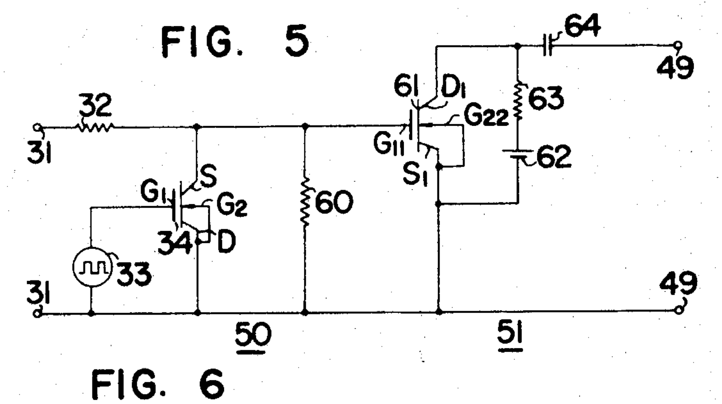

Such an offset voltage can be eliminated by the following embodiments of this invention. FIG. 5 illustrates a circuit diagram of one example of such embodiments wherein insulated gate field effect transistors are used not only as the modulator unit 50 but also as the amplifier unit 51 which are coupled directly without the use of a coupling capacitor. In this figure, reference numerals 31 through 34, inclusive, designate identical components corresponding to those shown in FIG. 3. The numeral 60 designates the load resistance of the transistor 34, and 61 designates an insulated gate field effect transistor having the actual construction as shown in FIG. 1. The first stage electrode of the transistor 61 is coupled directly to the source electrode S, and across the drain electrode $D_1$ and the source electrode $S_1$ of the transistor 61 there are connected in series a load resistance 63 and a voltage source 62. Outputs from this transistor 61 are derived to the output terminals 49 via a coupling capacitor 64.

Because the drain current of the field effect transistor 61 in the amplifier unit 51 is controlled by the electric field created by a voltage impressed across its first gate electrode $G_{11}$ and the source electrode $S_1$ so that substantially no current flows through the input circuit, it is not necessary to use a capacitor to block current from flowing into the modulator 50 from the amplifier 51.

Thus, even when current flows out from the source of excitation through interelectrode capacitances of the transistor 34, the magnitude of the offset voltage is greatly reduced because of the absence of a capacitor which accumulates electric charge.

FIGS. 8(*a*) and 8(*b*) are photographic records of actually observed voltages across the load resistance 60 when a coupling capacitor is inserted (FIG. 8(*a*)) and when the modulator and amplifier are coupled directly. By comparing these figures it will be readily observed that the magnitude of offset voltage is far smaller in the case of direct coupling. In the modification shown in FIG. 9, the fact that the insulated gate field effect transistor of the construction as shown in FIG. 1 is provided with two gate electrodes is utilized to impress on the second gate electrode a voltage of a nature as shown in FIG. 7(*b*) to cancel the spike wave voltage as shown in FIG. 7(*a*), thereby to decrease the offset voltage.

Figure 9:
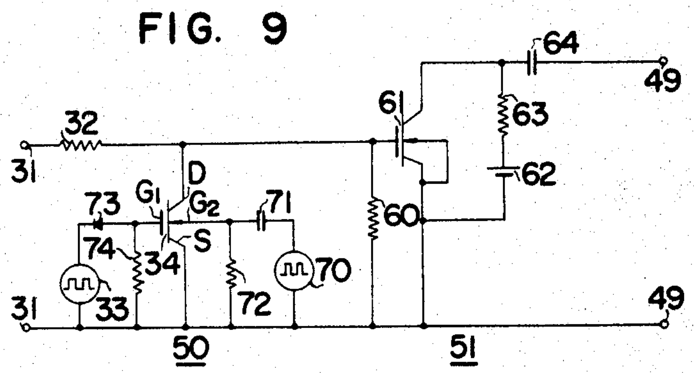

As shown in FIG. 9 a resistor 72 is connected between the second gate electrode $G_2$ and the source electrode S of a transistor 34 and the second gate electrode $G_2$ is also connected to a source 70 via a capacitor 71, said source producing a voltage of rectangular waveform having a phase opposite to that of the voltage of the source 33. Other reference characters and numerals designate corresponding identical circuit components in FIG. 5.

The voltage of rectangular waveform supplied from the source 70 is differentiated by a differentiating circuit consisting of the capacitor 71 and the resistor 72 to produce a voltage of spiked waveform which appears at the drain electrode D via the interelectrode capacitance between the second gate electrode $G_2$ and the drain electrode D.

Since the voltage of the excitation source 33 and the voltage of the source 70 are of opposite polarities, the current flowing through the interelectrode capacitance between electrode $G_1$ and D from the source 33 and the current flowing to the drain electrode D from the source 70 through the capacitance between electrodes $G_2$ and D are also out of phase by 180°, thus cancelling each other to decrease the offset voltages very effectively. The magnitude of the current flowing to the drain electrode D through the capacitance between electrodes $G_2$ and D can be adjusted to any desired value by adjusting the voltage of the source 70. While it is desirable that said voltages of spiked waveform be of exactly opposite phase but of the same waveform, actually, by the difference between these voltages produced offset voltage, even when the phase difference is slightly different from 180°. It is possible to sufficiently decrease the offset voltage when considering the mean value thereof.

Thus, in order to decrease offset voltages by utilizing the second gate electrode, it is necessary to take into consideration the variation in the respective interelectrode capacitances caused by the variation in ambient temperature. This is because, even when the circuit components are adjusted to cause the offset voltage to become zero at a given temperature, variation in the ambient temperature results in the variation in the interelectrode capacitances between the first gate electrode $G_1$ and the drain electrode D and between the second gate electrode $G_2$ and the drain electrode D, thereby producing offset voltages due to temperature variations. However, the capacitance between the electrodes $G_2$ and D separated by an insulator generally is not substantially affected by the ambient temperature.

Figure 13:
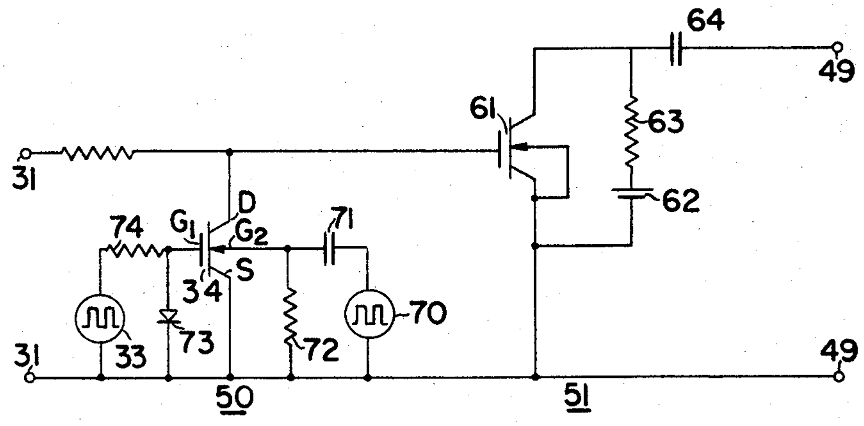

As shown in FIG. 9, in accordance with this invention a diode 73 is connected in the first gate circuit to minimize the offset voltage caused by variation in the ambient temperature. In the drawing, the diode 73 is connected in series with the first gate electrode $G_1$. However, the invention is not limited to this configuration, but an alternative configuration can attain the same effect, wherein diode 73 is connected in parallel with electrode $G_1$, as shown in FIG. 13. Since the capacitance between electrodes $G_2$ and D is a P-N junction capacitance, it will change depending on the ambient temperature in the same manner as the P-N junction capacitance of the diode 73, so that the effect upon the spiked wave voltage appearing at the drain electrode D through the capacitance between electrodes $G_1$ and D, caused by the change in the ambient temperature and the effect upon the spiked wave voltage appearing at the drain electrode D through the capacitance between the electrodes $G_2$ and D cancel each other. In this embodiment a capacitor having a given temperature coefficient may be substituted for the diode 73. When a capacitor 71 having substantially proper temperature coefficient to cancel the interelectrode capacitance between electrodes $G_2$ and D is employed, it is also possible to provide temperature compensation, thereby decreasing the offset. Ordinarily, an excitation voltage in the form of a rectangular wave having the same positive and negative amplitudes is used for the modulator 50, but in this invention utilizing an insulated gate field effect transistor, it is not always necessary to use equal positive and negative amplitudes.

Figure 10:
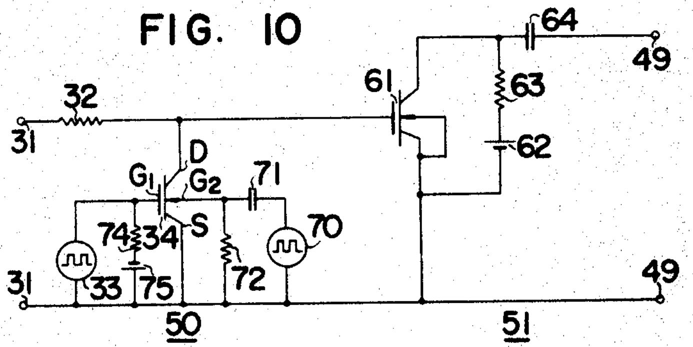
Figure 12:
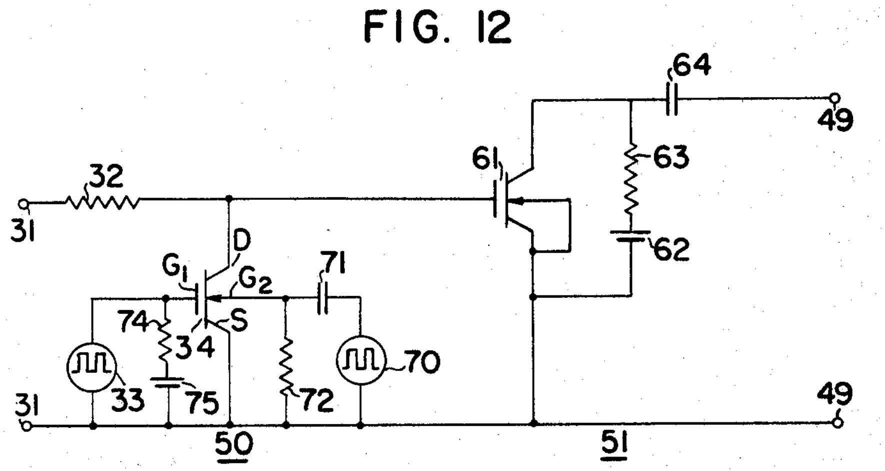

In a modification shown in FIG. 10, a source of bias voltage 75 is connected between the first gate electrode $G_1$ and the source electrode S of a field effect transistor 34 via a resistor 74. The polarity of the source 75 is such that the first gate electrode is negative with respect to the source electrode. As a result, the waveform of the excitation voltage applied across the electrodes $G_1$ and S becomes as shown in FIGS. 11(*a*) and 11(*b*), wherein the positive portion is smaller than the negative portion, or the excitation voltage is always negative. It is apparent that where a field effect transistor of opposite conductivity type to that of the transistor shown in FIG. 1 is used, the polarity of source 75 is determined so that the first gate electrode is positive with respect to the source electrode, as shown in FIG. 12. As shown in FIG. 9, instead of utilizing said biasing source, a diode 73 may be connected in the circuit of the first gate electrode thereby to apply to the electrode $G_1$ only a negative voltage.

It was found in the case shown in FIG. 5 that the drift as seen from the input was less than 10 microvolts per cycle when a resistor 32 of 300 kilo ohms and an excitation voltage of 8 volts (peak to peak) and 1 kilocycle were employed. This value is very small when compared with those of modulators utilizing conventional transistors of diodes. Thus, it is possible to provide modulator amplifier circuits of extremely high quality.

In the embodiments shown in FIGS. 5, 9, and 10, conventional junction type transistor (PNP type or NPN type) may be substituted for the insulated gate field effect transistor in the amplifier unit 51. It is also to be observed that the voltage of the excitation source 33 may be of any waveform other than a rectangular waveform, for example, a sinusodial waveform.

Since numerous changes may be made in the above described arrangements and constructions, and different embodiments of the invention may be devised without departing from the spirit and scope thereof, it is intended that all matters contained in the foregoing description or shown in the accompanying drawings be interpreted as illustrative and not in a limiting sense.

What we claim is:

1. A modulator amplifier circuit comprising: a modulator unit including an insulated gate field effect transistor, said transistor having a source electrode, a drain electrode and a gate electrode, thereby controlling current flowing through a current path extending between said drain and source electrodes by means of an electric field created by a gate voltage which is applied to said current path via an insulator film; input terminals adapted to receive D-C input signals; and a source of excitation voltage, said input signals applied to source electrode, and said excitation voltage being impressed across said gate and source electrodes of said transistor, thereby rendering conductive or nonconductive said path between said drain and source electrodes of said transistor so as to convert said input into alternating current; and an amplifier unit including a second insulated gate field effect transistor, having a source electrode, a drain electrode and a gate electrode, means to apply the output from said modulator unit across said gate and source electrodes, and means to obtain voltage between said source and drain electrodes, said amplifier unit being directly coupled to said modulator unit.

2. A semiconductor modulator amplifier circuit comprising: a modulator unit including a field effect transistor, said transistor including a substrate of a semiconductor body, source and drain regions of opposite conductivity type with respect to said substrate and formed on said substrate with a small gap therebetween to form a channel layer between said regions, a first gate electrode mounted on said channel layer through an insulator layer, and a second gate electrode formed on said semiconductor substrate; input terminals to which D-C input signals are applied, a first source to generate a voltage source of rectangular waveform and a second voltage source, the signals applied to said input terminals being impressed across said drain and source regions, said first voltage source being connected between said first gate electrode and said source region of said transistor, said second source being connected between said second gate electrode and said source region via a differentiating circuit whereby said transistor is turned "on"and "off" by the rectangular voltage from said first source so as to convert said input into alternating current; and an amplifier unit to amplify the output from said modulator unit.

3. The semiconductor modulator amplifier circuit according to claim 2 wherein said first source of rectangular wave is connected between the first gate electrode and the source electrode of an insulated gate field effect transistor, and a diode is connected in series, with said gate.

4. The semiconductor modulator amplifier circuit according to claim 2 wherein said first source of rectangular wave is connected between the first gate electrode and the source electrode of an insulated gate field effect transistor, and a diode is connected parallel with said gate.

5. The semiconductor modulator amplifier circuit according to claim 2, wherein the substrate of the field effect transistor is of p-type conductivity and the source, drain and channel layer, respectively, are of n-type conductivity, and a biasing means is inserted between the first gate electrode and the source electrode of said insulated gate field effect transistor utilized in said modulator section, said biasing means being effective for biasing said excitation voltage in the negative direction with respect to said first gate electrode.

6. The semiconductor modulator amplifier circuit according to claim 2, wherein the substrate of the field effect transistor is of n-type conductivity and the source and drain regions are of p-type conductivity, and a biasing means is inserted between the first gate electrode and the source electrode of said insulated gate field effect transistor utilized in said modulator section, said biasing means being effective for biasing said excitation voltage in the positive direction with respect to said first gate electrode.

7. The semiconductor modulator amplifier circuit according to claim 3, wherein said amplifier section comprises an insulated gate field effect transistor including a source electrode, a drain electrode and a gate electrode, and the current flowing through a path extending between said source and drain electrodes is controlled by an electric field created by a gate voltage applied to said path through an insulator layer, means to apply the output from said modulator across said gate and source electrodes, and means to derive an output voltage from between said drain and source electrodes.

References Cited

UNITED STATES PATENTS

| | | | |
|---|---|---|---|
| 3,204,160 | 8/1965 | Sah | 332—31 |
| 3,229,218 | 1/1966 | Sickles et al. | 330—29 |
| 3,281,699 | 10/1966 | Harwood | 325—440 |
| 3,311,756 | 3/1967 | Nagata et al. | 330—38 |

OTHER REFERENCES

Tipping et al., RCA TN No. 569, March 1964, "Insulated-Gate Field Effect Transistor Limiter Amplifier" 330–38FE.

ALFRED L. BRODY, *Primary Examiner.*